TIME DIVISION MULTIPLEX TRANSMISSION SYSTEM

Filed Aug. 16, 1961 2 Sheets-Sheet 1

INVENTORS.
RICHARD SCOTT
BARRIE BRIGHTMAN
J CARTER PERKINS, JR.
BY Robert Nathans
ATTORNEY

United States Patent Office 3,111,557

Patented Nov. 19, 1963

3,111,557

TIME DIVISION MULTIPLEX TRANSMISSION SYSTEM

Richard Scott, Rochester, Barrie Brightman, Webster, and J Carter Perkins, Jr., Victor, N.Y., assignors to General Dynamics Corporation, Rochester, N.Y., a corporation of Delaware Filed Aug. 16, 1961, Ser. No. 131,927
7 Claims. (Cl. 179—15)

The present invention relates to highly efficient time division multiplex transmission systems.

It is an object of the present invention to provide for the efficient transfer of energy representing intelligence between line circuits of a time division multiplex transmission system, regardless of how many line circuits are utilized in connection with a single common transmission channel or highway.

It is a further object of the present invention to provide a new and improved time division multiplex transmission system which utilizes a single inductor in the highway for the "resonant transfer" of energy rather than large numbers of inductors located in the line circuits of the prior art systems.

It is yet a further object of the present invention to provide a new, improved time division multiplex transmission system which may utilize a series, or series-shunt type of negative impedance repeater connected within the common transmission channel or highway.

Further objects and advantages of the invention will become apparent as the following description proceeds and the features of novelty which characterize the invention will be pointed out with particularity in the claims annexed to and forming a part of this specification.

Figure 1:
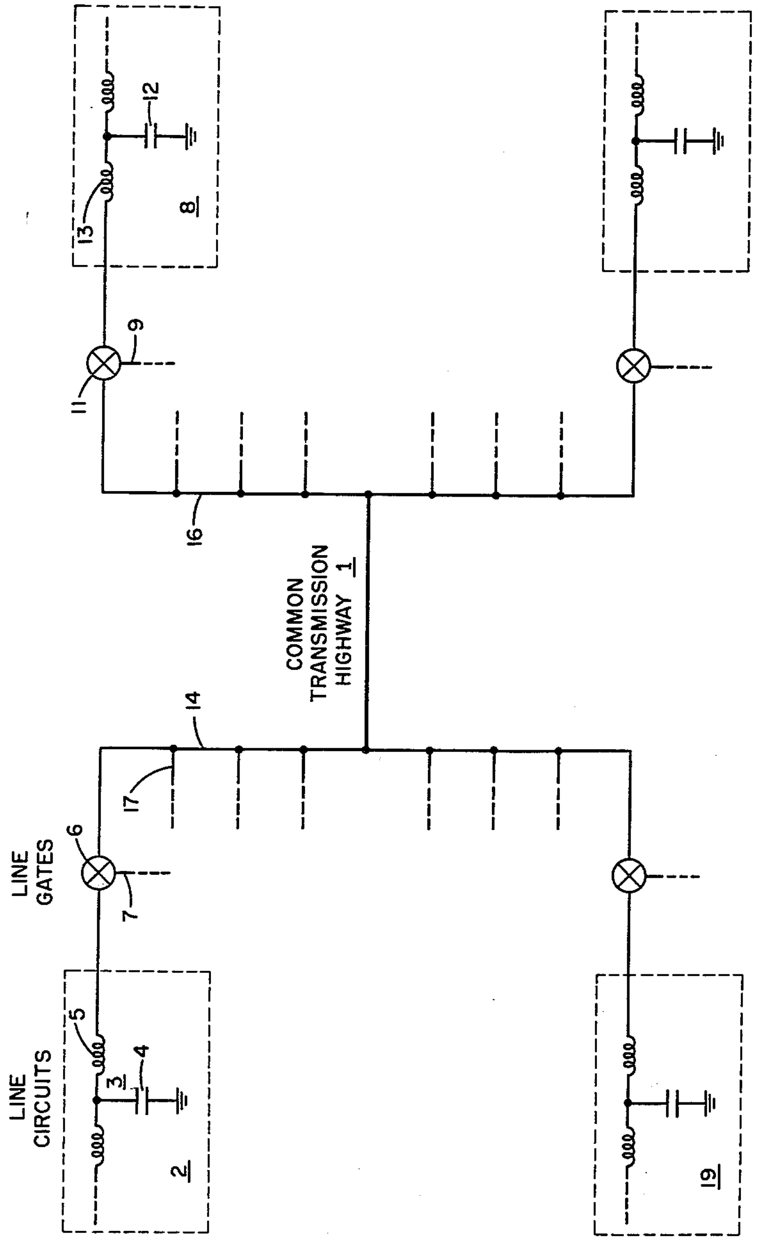
Fig. 1 PRIOR ART

For a better understanding of the invention, reference may be had to the accompanying drawing in which:

FIGURE 1 discloses schematically the prior art system; and

Figure 2:
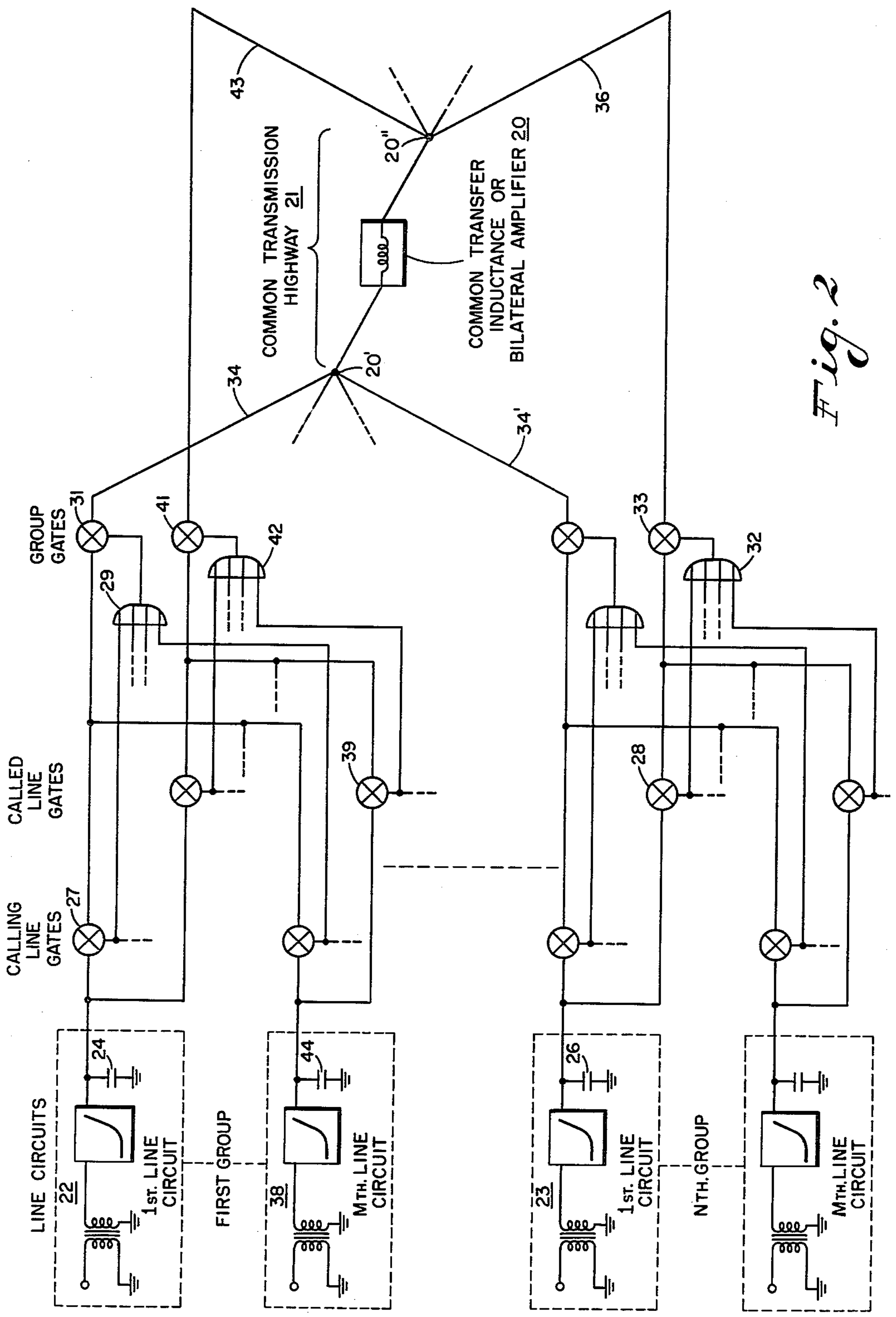

FIGURE 2 discloses one embodiment of the present invention.

Referring now to FIGURE 1 of the drawing, a plurality of line circuits are disclosed coupled to a common transmission channel or highway 1 through associated line gates. Although four line circuits with their associated line gates are disclosed in the drawing, it should be understood that as many as one hundred line circuits could be coupled to the transmission highway in these systems. Line circuit 2 comprises a low-pass filter 3, which includes a storage element such as capacitor 4, and transfer inductance 5, which inductance is coupled to the common transmission highway 1 through line gate 6. The input circuit to low-pass filter 3, not shown, includes a telephone subset. As is well known in the prior art, a charge is contained within capacitor 4, which is proportional to the amplitude of a voice signal. Control lead 7 of line gate 6 is coupled to gate control circuitry, not shown, which is well known in the prior art and forms no part of the present invention. When a telephone conversation is to take place between subscribers associated with line circuit 2 and line circuit 8, for instance, the control lead 7 of line gate 6 is pulsed simultaneously with control lead 9 of line gate 11 for an interval during each transmission frame, which interval is designated in the art as a time slot. The charge present within capacitor 4 must be transferred to capacitor 12. During each time slot, the changes in the amount of charge transferred from one transmission frame to the next are utilized to reconstruct the voice wave in the low-pass filter. It should be noted that during the time slot within each transmission frame that line gates 6 and 11 are enabled, a loop is completed comprising capacitor 4 of line circuit 2, inductor 5, line gate 6, common transmission highway 1, line gate 11, inductor 13 of line circuit 8, capacitor 12 and ground. The voltage across capacitor 4 causes the transfer of energy through the common transmission highway 1. Of course, the process is bilateral so that at times charges are being transferred from capacitor 12 to capacitor 4. The time in which these line gates are enabled and the values of the capacitors and inductors are such that the energy in capacitor 4 will, under ideal conditions, be completely transferred to capacitor 12 during this interval. The aforementioned loop may be regarded as a tank circuit having a fixed frequency of oscillation. The line gates are enabled for a time equal to one-half the period of oscillation of this tank circuit. Any variation in the enabling period of the line gates or any variation in the values of the capacitors or inductors will obviously result in the transfer of less energy than desired. This method of transferring energy is also discussed in patent application Serial No. 815,498, of Theodor Frankel, and assigned to the same assignee as the present invention.

Line gate 6 is coupled to highway 1 through conductor 14 and, in like manner, line gate 11 is coupled to highway 1 through conductor 16. A line circuit, not shown, would be coupled to conductor 14 via lead 17. In the event that it is desired to set up a telephone connection between line circuit 2 and the line circuit, not shown, coupled to lead 17, it is obvious that a shorter transmission path would be involved compared to the transmission path between line circuit 2 and line circuit 8. The transmission paths between line gates offer self-inductance, which may be considerable at the higher operating frequencies, and, accordingly, variations in length of the transmission path between line gates associated with connected line circuits cause a change in the aforementioned tank frequency which, in turn, causes a less efficient transfer of energy than desired. It should be noted that the transmission path between line circuit 2 and line circuit 8 will be considerably longer than the transmission path between line circuit 2 and that line circuit coupled to lead 17, or, for that matter, between line circuit 2 and line circuit 19. These variations in the length of transmission path, depending upon which line circuits are coupled together during a particular time slot, cause variations in the efficiency of energy transfer. The elimination of such variations is a major object of the present invention. In addition, the insertion of one transfer inductance within the common transmission channel or highway eliminates ninety-nine inductors situated in the line circuits of a hundred line system.

In the prior art system of FIGURE 1 it is quite possible that as many as one hundred line circuits may be coupled to a single common transmission highway. Even though a great number of these line circuits may not be in use, the disenabled line gates will display shunt capacitance between the transmission highway and ground. It has been found that this capacitance places a burden on the highway and interferes with the efficient transfer of energy between connected line circuits. It is also an object of the present invention to greatly eliminate this undesirable effect.

It has been suggested that the method of energy transfer discussed hereinabove be eliminated by inserting a bilateral amplifier, or series type negative impedance repeater, in the common transmission highway. This would result in doing away with the inductors within each line circuit, such as inductors 5 and 13 of FIGURE 1. However, it is obvious from the drawing that if line circuit 2 were to be coupled to line circuit 19 during a particular time slot, the bilateral amplifier would have no effect and would be operative only in those cases where a line circuit of the left-hand group of line circuits would be connected to a line circuit in the right-hand group of line circuits. It therefore follows that the bilateral amplifier of the series type was not used in the prior art. According to the present invention, a single series, or series-shunt type, bilateral amplifier may be utilized in the transmission highway because each and every conversation will pass through the transmission highway, in contrast with the prior art arrangement of FIGURE 1.

In the prior art one hundred line system disclosed in FIGURE 1, a fixed capacitor is added in shunt with highway 1 so that the total shunt capacitance of the highway is two-thirds of the total capacitance of the line circuit capacitors coupled together during any particular time slot. This is a well known technique for providing maximum energy transfer. A two hundred line prior art system would be constructed by coupling the highways of two of the configurations of FIGURE 1 together through an interhighway split gate. In this case, a fixed capacitor would be coupled in shunt with each highway so that the total shunt capacitance of both highways is equal to two-thirds of the capacitance of the capacitors within the two line circuits coupled together through the interhighway gate during a particular time slot. However, if the two line circuits coupled together during a particular time slot are both in the same one hundred line group, the total shunt capacitance of the highway of that group would not be sufficient to meet the aforementioned criteria. Accordingly, means would be provided for coupling an additional fixed capacitance in shunt with this highway during the time slot only in the event that two line circuits in the same group are coupled together. According to the present invention, the circuitry for adding an additional fixed shunt capacitor where both communicating line circuits are in the same group is eliminated.

Referring now to FIGURE 2 of the drawing, a first group of M line circuits and an Nth group of M line circuits are shown coupled to common transmission highway 21 through sets of calling line gates, called line gates, and group gates.

Let it be assumed that a subscriber associated with the first line circuit in the first group, namely, line circuit 22, is coupled to the first line circuit in the Nth group, namely, line circuit 23 during a particular time slot within recurring transmission frames. As in the case of the system schematically disclosed in FIGURE 1, the energy contained within capacitor 24 of line circuit 22 must be transferred to capacitor 26 of line circuit 23, and vice versa. Common control equipment, which is not shown and which is well known in the art, causes calling line gate 27 and called line gate 28 to be simultaneously pulsed during a particular time slot within recurring transmission frames. The enabling pulse applied to calling line gate 27 passes through OR gate 29 to enable group gate 31 and, in like manner, the enabling pulse which is applied to called line gate 28 passes through OR gate 32 to enable group gate 33. Accordingly, a transmission loop is completed which comprises capacitor 24, gate 27, gate 31, transmission line 34, common transmission highway 21 including transfer element 20 which could be an inductance or bilateral amplifier having a first terminal 20′ and a second terminal 20″, transmission line 36, group gate 33, called line gate 28, capacitor 26, and ground. Inductance 20 which is required for the resonant transfer of energy between line circuits is inserted in the transmission highway 21, as shown. As a result, the resonant transfer of energy takes place as in the prior art system schematically disclosed in FIGURE 1. It is important that the distributed reactance of line 34 be equal to the distributed reactance of 34′, and that the distributed reactance of 43 equal that of 36, for reasons previously discussed. In other words, all possible transmission loops must have equal parameters.

Let it be assumed that line circuit 22 is to be coupled with the Nth line circuit in the first group, namely, line circuit 38. Calling line gate 27 will be pulsed simultaneously with called line gate 39. The pulsing of called line gate 39 will cause group gate 41 to be enabled by virtue of OR gate 42. This transmission loop will comprise capacitor 24, calling line gate 27, group gate 31, conductor 34, common transmission highway 21, conductor 43, group gate 41, called line gate 39, and capacitor 44. It is obvious upon further inspection of the system disclosed in FIGURE 2 that regardless of which line circuits are connected together during a particular time slot within repetitive transmission frames, that the energy transferred from one capacitor to another, regardless of direction, must necessarily pass through the common inductance situated within highway 21, as shown in FIGURE 2. Accordingly, the need for a precision inductance within each line circuit has been eliminated and large savings are thereby effected. In addition, any possible adjustment of a single inductor is far less costly than the possible adjustment of inductors within individual line circuits.

If desired, a bilateral amplifier may be inserted within highway 21 and the inductor may be eliminated. This bilateral amplifier may be of the series, or series-shunt type and will be fully effective since all calls must pass through the common transmission highway 21.

During a particular time slot within repetitive transmission frames, a single group of calling and a single group of called line gates will be coupled to the common transmission highway owing to the isolation action of the group gates. All other calling and called line gates will not be coupled to the highway. Therefore, the aforementioned undesirable effect which is produced by loading the common transmission highway with all of the line gates is partially eliminated.

While there has been disclosed what is at present considered to be the preferred embodiment of the invention, other modifications will readily occur to those skilled in the art. It is not, therefore, desired that the invention be limited to the specific arrangement shown and described, and it is intended in the appended claims to cover all such modifications as fall within the true spirit and scope of the invention.

What is claimed is:

1. In a time division multiplex transmission system, N groups of M line circuits, each line circuit including a storage element, M and N being integers, a transfer element having a first and second access point, M calling line gates associated with each group of M line circuits, M called line gates associated with each group of M line circuits, a first and second group gate associated with each group of M line circuits, means for coupling one terminal of each calling line gate in each group of line circuits to a corresponding storage element, means for coupling one terminal of each called line gate in each group of line circuits to a corresponding storage element, means for coupling the other terminal of each calling line gate in each group of line circuits to one terminal of an associated first group gate, means for coupling the other terminal of each first group gate to the first access point of said transfer element, means for coupling the other terminal of each called line gate in each group of M line circuits to one terminal of an associated second group gate, means for coupling the other terminal of each second group gate to the second access point of said transfer element, and means for enabling one calling line gate with its associated first group gate while enabling one called line gate with its associated second group gate during a subinterval within recurring transmission frames.

2. The combination as set forth in claim 1 wherein said transfer element comprises an inductive reactance.

3. The combination as set forth in claim 1 wherein said transfer element comprises a bilateral amplifier.

4. In a time division multiplex transmission system, N groups of M line circuits, each line circuit including a storage element, M and N being integers, a common transmission path, M calling line gates associated with each group of M line circuits, M called line gates associated with each group of M line circuits, a first and second group gate associated with each group of M line circuits, means for coupling one terminal of each calling line gate in each group of line circuits to a corresponding storage element, means for coupling one terminal of each called line gate in each group of line circuits to a corresponding storage element, means for coupling the other terminal of each calling line gate in each group of line circuits to one terminal of an associated first group gate, means for coupling the other terminal of each first group gate to said common transmission path, means for coupling the other terminal of each called line gate in each group of M line circuits to one terminal of an associated second group gate, means for coupling the other terminal of each second group gate to said common transmission path, and means for enabling one calling line gate with its associated first group gate while enabling one called line gate with its associated second group gate during a subinterval within recurring transmission frames.

5. In a time division multiplex transmission system, a plurality of transmission loops comprising a plurality of line circuits each including a storage element having a first terminal coupled to ground and having a second terminal, a transfer element including first and second terminals for deriving a voltage difference across said last mentioned terminals in response to a potential being applied between one of said terminals and said ground, a first plurality of means for selectively coupling the second terminal of a storage element of any line circuit of said plurality of line circuits to the first terminal of said transfer element during a particular interval within recurring transmission frames, said interval having a duration equal to half the period of oscillation of said transmission loops, a second plurality of means for selectively coupling the second terminal of a storage element of any line circuit of said plurality of line circuits to the second terminal of said transfer element during said particular interval within recurring transmission frames, all of the first plurality of means for selectively coupling having substantially equal distributed reactances and all of the second plurality of means for selectively coupling having substantially equal distributed reactances.

6. The combination as set forth in claim 5 wherein said transfer element comprises an inductive reactance.

7. The combination as set forth in claim 5 wherein said transfer element comprises a series connected bilateral amplifier.

References Cited in the file of this patent

UNITED STATES PATENTS

| | | |
|---|---|---|
| 2,917,583 | Burton et al. | Dec. 15, 1959 |
| 2,927,967 | Edson | Mar. 8, 1960 |
| 2,936,338 | James et al. | May 10, 1960 |
| 2,962,551 | Johannesen | Nov. 29, 1960 |
| 2,962,552 | Crowley | Nov. 29, 1960 |